United States Patent
Kwon et al.

(10) Patent No.: US 9,247,499 B2
(45) Date of Patent: Jan. 26, 2016

(54) POWER SAVING METHOD IN A WIRELESS COMMUNICATION SYSTEM

(75) Inventors: Yeong Hyeon Kwon, Anyang-si (KR); Han Gyu Cho, Anyang-si (KR); Sung Ho Moon, Anyang-si (KR); Kyu Jin Park, Anyang-si (KR); Seung Hee Han, Anyang-si (KR); Jae Hoon Chung, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 41 days.

(21) Appl. No.: 13/499,454

(22) PCT Filed: Jun. 23, 2010

(86) PCT No.: PCT/KR2010/004071
§ 371 (c)(1),
(2), (4) Date: Mar. 30, 2012

(87) PCT Pub. No.: WO2011/071220
PCT Pub. Date: Jun. 16, 2011

(65) Prior Publication Data
US 2012/0201182 A1 Aug. 9, 2012

Related U.S. Application Data

(60) Provisional application No. 61/267,817, filed on Dec. 9, 2009.

(51) Int. Cl.
*H04W 52/02* (2009.01)
*H04W 92/10* (2009.01)
(Continued)

(52) U.S. Cl.
CPC .......... *H04W 52/0225* (2013.01); *H04W 28/22* (2013.01); *H04W 52/0212* (2013.01); *H04W 52/146* (2013.01); *H04W 52/367* (2013.01); *H04W 68/025* (2013.01);
(Continued)

(58) Field of Classification Search
CPC .. H04L 12/12; H04W 68/00; H04W 52/0216; H04W 52/028; H04W 84/18; H04W 84/12; Y02B 60/50
USPC .......................................... 370/311, 328–332
See application file for complete search history.

(56) References Cited

U.S. PATENT DOCUMENTS 5,854,784 A * 12/1998 Solve .................... H04B 7/2125
370/311
6,917,598 B1 * 7/2005 Emeott ............. H04W 52/0225
370/311

(Continued)

FOREIGN PATENT DOCUMENTS

KR    10-2009-0047597 A    5/2009

*Primary Examiner* — Jae Y Lee
*Assistant Examiner* — Jean F Voltaire
(74) *Attorney, Agent, or Firm* — Birch, Stewart, Kolasch & Birch, LLP

(57) ABSTRACT

The present invention relates to a power-saving method in a wireless communication system. In a power-saving method for a terminal of a wireless communication system according to one aspect of the present invention, the terminal receives configuration information relating to power-saving from a base station and operates in a power-down mode in which receive processing is not carried out in accordance with the configuration information relating to power saving; and the configuration information comprises at least one or other of information relating to a time point at which the base station is not transmitting packets to the terminal and a time point at which the base station is transmitting packets to the terminal.

18 Claims, 4 Drawing Sheets

(51) Int. Cl.
  *H04W 52/14* (2009.01)
  *H04W 28/22* (2009.01)
  *H04W 52/36* (2009.01)
  *H04W 72/12* (2009.01)
  *H04W 74/04* (2009.01)
  *H04W 76/04* (2009.01)
  *H04W 74/08* (2009.01)
  *H04W 68/02* (2009.01)
  *H04L 1/18* (2006.01)

(52) U.S. Cl.
  CPC ......... *H04W 72/12* (2013.01); *H04W 72/1284* (2013.01); *H04W 74/04* (2013.01); *H04W 74/08* (2013.01); *H04W 76/04* (2013.01); *H04W 92/10* (2013.01); *H04L 1/1887* (2013.01); *Y02B 60/50* (2013.01)

(56) References Cited

U.S. PATENT DOCUMENTS

| | | | |
|---|---|---|---|
| 2006/0072614 A1* | 4/2006 | Ogiso | H04B 1/1615 370/474 |
| 2007/0109964 A1* | 5/2007 | Kwak | H04W 72/1284 370/230 |
| 2008/0045159 A1 | 2/2008 | Mashimo et al. | |
| 2008/0194201 A1* | 8/2008 | Sinivaara | H04W 52/0216 455/41.2 |
| 2009/0161587 A1* | 6/2009 | Ishii | H04W 52/0216 370/311 |
| 2010/0050039 A1* | 2/2010 | Zhang et al. | 714/749 |
| 2012/0147816 A1* | 6/2012 | Gholmieh | H04W 68/025 370/328 |

* cited by examiner

POWER SAVING METHOD IN A WIRELESS COMMUNICATION SYSTEM

CROSS REFERENCE TO RELATED APPLICATIONS

This application is the National Phase of PCT International Application No. PCT/KR2010/004071 filed on Jun. 23, 2010, which claims priority under 35 U.S.C. 119(e) to U.S. Provisional Application No. 61/267,817 filed on Dec. 9, 2009, all of which are hereby expressly incorporated by reference into the present application.

FIELD OF THE INVENTION

The present invention relates to a wireless communication system and, more particularly, to a power-saving method in a wireless communication system.

BACKGROUND ART

In the related wireless communication system, since a modem of a user equipment is unaware of when a signal is to be transmitted, the modem is always in a stand-by mode in order to receive a signal whenever transmitted. Therefore, in the related art wireless communication system, excessive power consumption occurs. More specifically, since the modem does not know when a packet will be transmitted, the user equipment is required to be operated in full power starting from the RF to the baseband processing at all times. Also, the user equipment determines whether or not a signal is being received. And, when it is determined that a signal is received, the user equipment uses the output of the baseband processing. And, when it is determined that a signal is not received, the user equipment discards the output.

The operations of the modem are generally performed while the user equipment is in a state ready to receive a packet. Accordingly, most of the power related to the reception unit is insignificantly wasted. Most particularly, such problem becomes more critical when the user equipment received a streaming service or an audio service.

Even while the user equipment performs a voice communication process, the user equipment is required to monitor traffic during all times in order to achieve instructions such as the reception of other data traffic or the delivery related to any re-transmission, delivery related to readjustment of resources, and so on. And, the power required for monitoring the traffic is mostly consumed and wasted insignificantly. Thus, the related art user equipment is disadvantageous in that, while a user is making a voice call (or phone call), the user equipment consumes an excessive amount of power as compared to the actual existing traffic.

Such disadvantage in the user equipment also occurs when the user equipment uses a streaming service. Therefore, a method preventing the user equipment from excessively consuming and wasting power, when the user equipment is using such services, or even while the user equipment is performing any other operations, is required to be developed.

DETAILED DESCRIPTION OF THE INVENTION

Technical Objects

As described above, the related art user equipment is disadvantageous in that a considerable amount of power is being wasted.

A technical object of the present invention is to provide a power-saving method that can reduce such waste of power in the user equipment.

The technical objects of the present invention will not be limited only to the objects described above. Accordingly, additional technical objects of the present application will be set forth in part in the description which follows and in part will become apparent to those having ordinary skill in the art upon examination of the following or may be learned from practice of the present application.

Technical Solutions

In order to achieve the object of the present invention, according to an aspect of the present invention, in a power-saving method performed by a user equipment in a wireless communication system, the power-saving method includes the steps of receiving configuration information on power-saving from a base station, and operating on a power-down mode, wherein the user equipment does not perform any reception process, in accordance with the received configuration information on power-saving. And, herein, the configuration information may include at least one of information on a time point, at which the base station is not scheduled to transmit any packet to the user equipment, and information on a time point, at which the base station is scheduled to transmit a packet to the user equipment.

In order to achieve the object of the present invention, according to another aspect of the present invention, in a power-saving method performed by a base station in a wireless communication system, the power-saving method includes the steps of transmitting configuration information on power-saving to a user equipment, wherein the configuration information on power-saving includes at least one of information on a time point, at which the base station is not scheduled to transmit any packet to the user equipment, and information on a time point, at which the base station is scheduled to transmit a packet to the user equipment, and transmitting a packet to the user equipment in accordance with the configuration information.

In order to achieve the object of the present invention, according to yet another of the present invention, a user equipment includes a reception module configured to receive configuration information on power-saving from a base station, and a processor configured to operate on a power-down mode, wherein the user equipment does not perform any reception process, in accordance with the received configuration information on power-saving. Herein, the configuration information may include at least one of information on a time point, at which the base station is not scheduled to transmit any packet to the user equipment, and information on a time point, at which the base station is scheduled to transmit a packet to the user equipment.

In order to achieve the object of the present invention, according to a further aspect of the present invention, a base station includes a processor configured to generate configuration information on power-saving, wherein the configuration information on power-saving includes at least one of information on a time point, at which the base station is not scheduled to transmit any packet to a user equipment, and information on a time point, at which the base station is scheduled to transmit a packet to a user equipment, and a transmission module configured to transmit the configured configuration information to the user equipment and to transmit a packet to the user equipment in accordance with the configuration information.

At this point, the configuration information may correspond to information on an HARQ ID, which is not required to be received by the user equipment.

Furthermore, the configuration information may correspond to information on a subframe that is to be received by the user equipment with respect to a predetermined cycle period.

Effects of the Invention

According to the exemplary embodiments of the present invention, by being operated in a power-down mode, the user equipment may reduce the amount of power consumption.

The effects that may be gained from the embodiment of the present invention will not be limited only to the effects described above. Accordingly, additional effects of the present application will be set forth in part in the description which follows and in part will become apparent to those having ordinary skill in the art upon examination of the following or may be learned from practice of the present application. More specifically, unintended effects obtained upon the practice of the present invention may also be derived by anyone having ordinary skill in the art.

BEST MODE FOR CARRYING OUT THE PRESENT INVENTION

Figure 1:
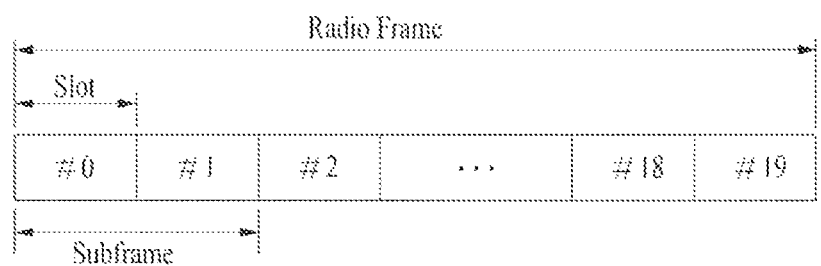
FIG. 1 illustrates an exemplary frame structure of a wireless communication system.

Hereinafter, the preferred embodiments of the present invention will now be described in detail with reference to the accompanying drawings. The detailed description of the present invention that is to be disclosed along with the appended drawings is merely given to describe the exemplary embodiment of the present invention. In other words, the embodiments presented in this specification do not correspond to the only embodiments that can be realized according to the present invention. In the following description of the present invention, the description of detailed features of the present invention will be given in order to provide a full and complete understanding of the present invention. However, it will be apparent to those skilled in the art that the present invention can be realized even without the detailed features described herein. For example, although the following description is given based upon the assumption that the mobile communication system corresponds to a 3GPP2 802.16 system, with the exception for the unique features of the 3GPP2 802.16 system, the other features may also be applied to any other arbitrary mobile communication system.

In some cases, in order to avoid any ambiguity in the concept (or idea) of the present invention, some of the structures and devices disclosed (or mentioned) in the present invention may be omitted from the accompanying drawings of the present invention, or the present invention may be illustrated in the form of a block view focusing only on the essential features or functions of each structure and device. Furthermore, throughout the entire description of the present invention, the same reference numerals will be used for the same elements of the present invention.

Furthermore, in the following description of the present invention, it is assumed that the user terminal (or user equipment) universally refers to a mobile or fixed user-end device, such as a UE (User Equipment), an MS (Mobile Station), and so on. Additionally, it is also assumed that the base station universally refers to as an arbitrary node of a network end, which communicates with the user equipment, such as a Node B, an eNode B, a Base Station, and so on.

First of all, a frame structure of a wireless communication system will be described in detail with reference to FIG. 1. FIG. 1 illustrates the frame structure of a Long Term Evolution (LTE) system. As shown in FIG. 1, one frame includes 10 subframes, and one subframe includes 2 slots. The time required for transmitting one subframe is referred to as a transmission time interval (hereinafter referred to as "TTI"). For example, one subframe may correspond to 1 ms, and one slot may correspond to 0.5 ms.

One slot includes a plurality of orthogonal frequency division multiplexing (OFDM) symbols. An OFDM symbol may also be referred to as an Orthogonal Frequency Division Multiple Access (OFDMA) symbol or a Single-carrier FDMA (SC-FDMA) symbol or a symbol period.

Depending upon the length of a cyclic prefix (hereinafter referred to as "CP"), a slot includes 7 or 6 OFDM symbols. A normal CP and an extended CP exist in the LTE system. In case of using a normal CP, one slot includes 7 OFDM symbols. And, in case of using an extended CP, one slot includes 6 OFDM symbols. The extended CP is used when a delay spread is large.

Figure 2:
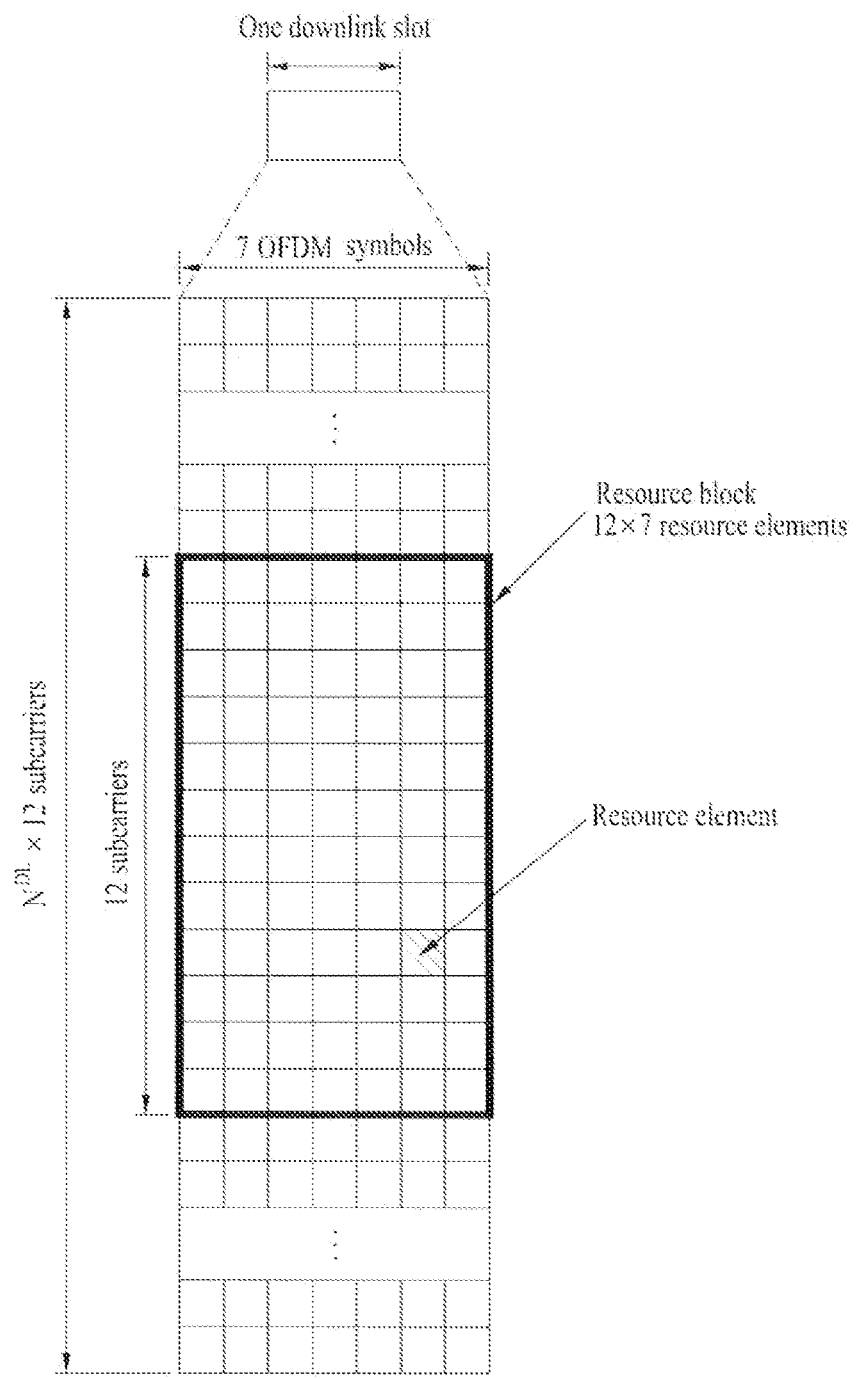
FIG. 2 illustrates a resource structure of a downlink slot.

FIG. 2 illustrates a resource structure of a downlink slot. FIG. 2 illustrates a case when one slot includes 7 OFDM symbols. A resource element (RE) corresponds to an area consisting of one OFDM symbol and one subcarrier. And, a resource block (RB) corresponds to an area consisting of multiple OFDM symbols and multiple subcarriers. For example, a resource block may include 7 OFDM symbols in a time domain and may include 12 subcarriers in a frequency domain. The number of resource blocks included in one slot may be decided in accordance with a downlink bandwidth.

Figure 3:
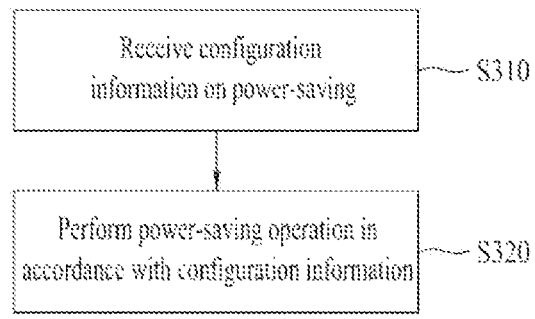
FIG. 3 illustrates power-saving method according to an exemplary embodiment of the present invention.

Subsequently, a power-saving method according to an exemplary embodiment of the present invention will be described in detail with reference to FIG. 3. FIG. 3 illustrates power-saving method according to an exemplary embodiment of the present invention.

As shown in FIG. 3, the user equipment receives configuration information on power-saving from the base station (S310).

When the user equipment receives information that the base station will not be transmitting any packet to the user equipment at a specific time point, the user equipment may be capable of stalling (or stopping) the operation of the modem at the corresponding time point. At this point, the user equipment may stall the operation starting from an RF end up to a baseband processing end. Therefore, the configuration information on power-saving includes information on a time point at which the base station does not transmit any control packet or data packet to the user equipment.

By referring to the received configuration information on power-saving, the user equipment may be capable of knowing the time point at which the base station transmits the packet to the user equipment and of knowing the time point at which the base station does not transmit any packet to the user equipment. Accordingly, the user equipment may be operated at a power-up mode at the time point when the base station transmits a packet to the user equipment, and the user equipment may be operated at a power-down mode at the time point when the base station does not transmit any packet to the user equipment.

The exemplary embodiment of the present invention proposes 5 different types of configuration information on power-saving.

The first format corresponds to a method of defining an HARQ ID, which the user equipment is not required to receive.

Since multiple HARQ (Hybrid Automatic Retransmit reQuest) processing is defined in an intermixed format, the base station may decide an HARQ ID, which is not required to be received by the user equipment, so as to be capable of defining a reception pattern of the user equipment. Accordingly, the user equipment may stall (or pause) the receiving operation with respect to the HARQ ID, which is not required to be received by the user equipment.

Alternatively, after the base station and the user equipment agrees upon an HARQ ID monitoring set, the user equipment may perform the receiving operation only during a subframe respective to the agreed HARQ ID monitoring set. Based upon the load, traffic size, and channel status of the user equipment, the base station may decide the HARQ ID monitoring set, which is to be assigned to the user equipment.

When considering the operation of the user equipment only during subframes that are related to a specific HARQ ID, it may be considered that all of the data and control information transmitted from the base station are delivered only to the corresponding subframes. Alternatively, when a transmission rule for additional control information related to a specific subframe or additional control information related to specific data or control information is defined separately, the user equipment may be operated in the power-up mode at the corresponding time point. And, this may be defined in accordance with a corresponding subframe or may be implicitly defined.

A second format corresponds to a method of defining a reception pattern of the user equipment is subframe units. More specifically, this method defines subframes that shall be received by the user equipment with respect to a consistent cycle period. During subframes other than the defined subframes that shall be received by the user equipment, the user equipment may stall the processing operations.

Among designated subframes, subframes each including a control channel, which is required to be monitored by the user equipment, may not be explicitly defined. For example, information, such as power control information respective to a specific portion, such as a subframe, to which system information is transmitted, or a shared control channel, may be transmitted regardless of the data transmission. Therefore, when setting up reception configurations respective to a subframe, power-saving information for different subframes may be given (or assigned) in accordance with the different types of information (e.g.: data, allocation information, power control information, system information, etc.), which are to be actually received by the user equipment.

A third format corresponds to a Dynamic power-off method. The dynamic power-off method corresponds to a method of assigning the user equipment with an authority to stall (or pause or stop) the reception processing operation of the user equipment during a predetermined time period, when the base station transmits a power-off signal through an L1/L2 control information with respect to a subframe or a time period, during which the user equipment is required to be operation. Herein, the power-off signal may be transmitted through a user equipment specific (or UE-specific) space or a shared search space. The power-off information, which is transmitted to the user equipment, may be delivered to the user equipment in a unicast format, or may be delivered to the user equipment in a broadcast format along with the information of other user equipments.

A fourth format corresponds to—may correspond to a Discontinuous Reception (hereinafter referred to as "DRX") method. When a packet is not received during a predetermined time period, the DRX method switches the operation mode of the user equipment to a DRX mode. During the DRX mode, the user equipment remains in a low power consumption state. And, then, the user equipment is periodically turned back on so as to monitor signals of the base station. Herein, a short DRX method corresponds to a method of setting up the time interval for shifting to the DRX mode to a very short interval. More specifically, when a packet is not received from the base station during the very short period of time (or time interval), the operation mode of the user equipment may be shifted to the DRX mode. Accordingly, the user equipment may be capable of stalling (or interrupting) the reception process very dynamically, thereby being capable of reducing power consumption.

The fifth format corresponds to a method of having the base station notify the user equipment of a transmission unit, during which the base station will not be transmitting any packet to the user equipment, among the multiple transmission units assigned to the user equipment.

The multiple transmission unit scheduling method corresponds to a method of having the base station assign multiple transmission units to the user equipment. Herein, the multiple transmission unit scheduling method may include Long TTI scheduling and Multi-TTI scheduling. When the base station performs the multiple transmission unit scheduling, among the multiple transmission units assigned to the user equipment, the base station may transmit a packet to a partial transmission unit, and the base station may not transmit a packet to another partial transmission unit. In this case, when the base station notifies the user equipment of the transmission unit, during which the packet will not be transmitted, the user equipment may stall the reception processing operation during the corresponding transmission unit.

This may be defined as a change in the signal processing unit performing communication with the user equipment and the base station. And, this may be differently set-up for each user equipment. For example, a specific user equipment may search for control information from the base station during each unit of 1 ms. And, another user equipment may search for control information from the base station during each unit of 2 ms. And, yet another user equipment may search for control information from the base station during each unit of 4 ms. In this case, at a time point corresponding to the respective search unit, the user equipment may also receive control information respective to a section equivalent to the corresponding search unit. The control information that is received during this section may indicate whether or not a signal of data or control information actually exist by being configured to have the base station not transmit the corresponding signal to a portion of the corresponding section, or the whole corresponding section, randomly.

Referring back to FIG. 3, the user equipment performs power-saving in accordance with the received configuration information on power-saving (S320). The user equipment operates in a power-down mode in accordance with information on a time point, at which the base station does not transmit any packet to the user equipment, the information being included in the configuration information on power-saving. More specifically, the user equipment is operated in a power-down mode, which does not perform the reception processing operations at a time point, at which the base station does not transmit any packet to the user equipment.

While the user equipment is being operated in a power-down mode, the user equipment does not perform channel measurement on a section, which does not include any packet transmitted from the base station. Accordingly, the base station interprets a channel measurement report based upon a channel measurement gap, which occurs while the user equipment is being operated in the power-down mode.

Alternatively, even while the user equipment is being operated in the power-down mode, the user equipment may detect only a signal specified for the channel measurement process, so as to perform the channel measurement process.

In order to have the user equipment shift its operation mode from the power-down mode to a power-up mode, the user equipment converts the power state of the reception mode to a normal-state. Herein, the power-up mode corresponds to a mode perform performing the reception processing operation.

While the user equipment is being operated in the power-down mode of a downlink, the user equipment may perform uplink transmission, or the user equipment may stop the operation. At this point, signals enabling the operation of the user equipment to be stopped may include scheduling request, channel measurement report, sounding, and so on. When the operation mode of the user equipment is shifted to the power-up mode, such information may be transmitted through a channel designated to transmit such information, or such information may be embedded in the respective data, thereby being transmitted.

While the user equipment is being performing the power-saving operation, the base station may transmit a packet to the user equipment in accordance with the configuration information on power-saving. More specifically, at a time point, which is set up to allow the user equipment to be operated in the power-down mode, the base station does not transmit any packet to the user equipment. And, at other time points, the base station may transmit packets to the user equipment.

Furthermore, the base station performs synchronization between a downlink traffic and an uplink traffic. More specifically, in order to allow the power-down mode to be activated during a downlink subframe, information on the uplink traffic should be configured to be also received, when the user equipment is being operated in the power-up mode. For example, the base station transmits an acknowledgeament/non-acknowleadgeament (ACK/NACK) response respective to the uplink traffic to the user equipment at a time point when the user equipment can receive the downlink traffic. In order to support such operations, it is preferable that the uplink and the downlink are both operated by the same method, such as synchronous HARQ.

The present invention may also be applied to a system, which is operated in a Time division duplex (hereinafter referred to as "TDD"). And, in this case, the downlink/uplink HARQ relation should be designed so that the time points, at which each acknowledgment response respective to the downlink HARQ and the uplink HARQ are being transmitted, have the same structure. Accordingly, among the TDD subframe configuration, it is preferable that the downlink/uplink HARQ relation is defined to have the same active time between one another. And, otherwise, by assigning information to the user equipment respective to maintaining an HARQ relation having the same active time, or by defining a specific subframe pattern, the user equipment may actively set up the power-down mode.

The user equipment and the base station is required to transmit information indicating whether or not the user equipment and the base station can support the power-saving method according to the exemplary embodiment of the present invention to one another. More specifically, when the user equipment accesses a specific base station, the base station should notify the user equipment whether or not the corresponding base station supports the power-saving method. And, the user equipment should also notify the base station whether or not the corresponding user equipment supports the power-saving method. Therefore, a bit indicating whether or not the power-saving method is being supported should be determined in the control information of the base station and the user equipment.

Either the base station may initiate the power-saving operation, or the user equipment may initiate the power-saving operation. When the power-saving operation is initiated by the base station, the power-saving operation may be defined in accordance with a buffer state of the base station, and the related signaling may correspond to a format respective to a base station standard regulation.

Herein, it is efficient that the power-saving operation is initiated by the user equipment. When the power-saving operation is initiated by the base station, since the base station does not include information on the specific traffic that is to be induced by the user equipment, unnecessary overhead may occur.

When the power-saving operation is initiated by the user equipment, the user of the user equipment may define the operation mode. In order to be capable of initiating the power-saving operation, the user equipment should transmit a power-saving request message to the base station. At this point, the user equipment may define a PRACH or a random access channel, so as to transmit the power-saving request message. Alternatively, the user equipment may transmit the power-saving request message through a scheduling request or through a similar procedure.

Unlike the downlink transmission, in the uplink transmission, the user equipment is sufficiently provided with information that can stall the transmission processing operation by a scheduling process performed by the base station. Therefore, during a section in which a traffic is not required to be transmitted, the user equipment may be capable of turning off the module with respect to the transmission processing operation.

The base station may determine a PDCCH-less subframe. A specific subframe may be defined to have a format, wherein the user equipment performs RF, ADC, and baseband processing, but wherein the user equipment does not decode the PDCCH. Accordingly, although the user equipment may consume power required for baseband processing the reception signal, the power required for decoding the PDCCH may be saved.

This situation corresponds to when, provided that most of the baseband processing is required to be performed during the process of calculating the channel measurement information, the user equipment designates a subframe, in which the PDCCH does not exist, so that the user equipment can save (or economize) power. The format of the related signal may be identically described and applied as described above. However, in the corresponding subframe, instead of being operated in the power-down operation mode, the user equipment is not required to receive the PDCCH.

Among the above-described information, some of the information may be transmitted to the user equipment through a higher layer signaling, such as RRC signaling. As described above, by defining a means that can indicate that the user equipment is not required to definitely perform the reception process, the method according to the present invention may prevent the user equipment from consuming a large amount of energy (or power) during the corresponding transmission/reception section, by choosing not to perform any kind of processing operation.

Also, in addition to the above-described purpose of power saving, the present invention may also be used for the following purpose.

The user equipment may be assigned with multiple reception patterns from the base station. The assigned reception patterns may be used with respect to the same RAT and may also be used with respect to different RATs corresponding to another network. For example, reception pattern A may be used in a communication process performed via LTE-A, and reception pattern B may be used in a communication process performed via Wi-Fi.

Also, the assigned reception patterns may also be used in a communication process between different cells and different user equipments within a multi-tier network. For example, the user equipment may communicate with a macro base station by using reception pattern A, while communicating with a femto base station by using reception pattern B. Alternatively, the user equipment may communicate with the base station by using reception pattern A, while configuring an ad-hoc within a neighboring user equipment by using reception pattern B.

Figure 4:
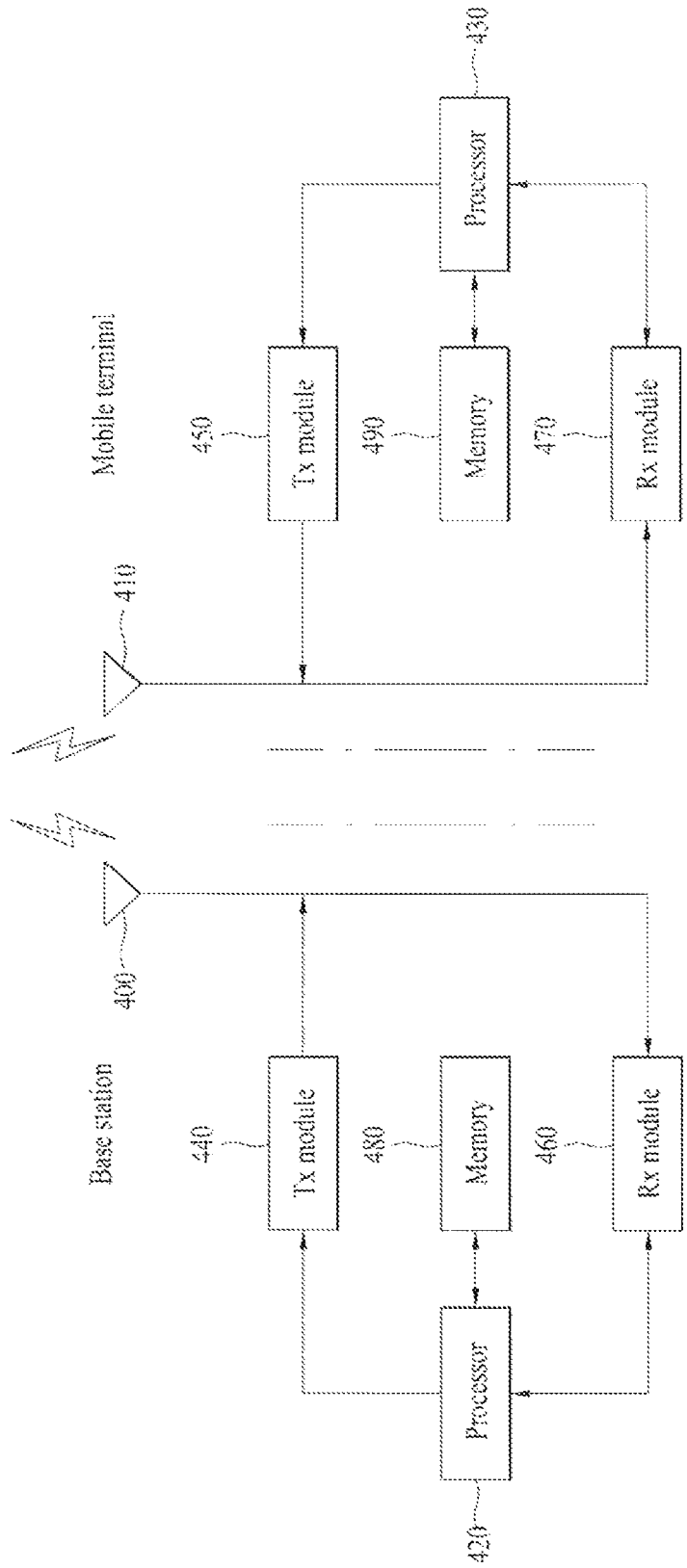
FIG. 4 illustrates a block view showing the structures of a mobile terminal and a base station that can realize the exemplary embodiments of the present invention.

FIG. 4 illustrates a block view showing the structures of a mobile terminal and a base station that can realize the exemplary embodiments of the present invention.

Each of the mobile terminal (or advanced mobile station (AMS)) and the base station (or advanced base station (ABS)) includes an antenna (500, 510) configured to transmit and receive information, data, signals, and/or messages, a transmission module (Tx module) (540, 550) configured to control the antenna so as to transmit messages, a reception module (Rx module) (560, 570) configured to control the antenna so as to receive messages, a memory (580, 590) configured to store information related to the communication with the base station, and a processor (520, 530) configured to control the transmission module, the reception module, and the memory. At this point, the base station may correspond to a femto base station or a macro base station.

The antenna (520, 530) performs the function of transmitting a signal, which is generated from the transmission module (540, 550) to the outside, or the function of receiving a radio signal from an external source and delivering the received radio signal to the receiving module (560, 570). When a multiple antenna (MIMO) function is supported, at least 2 or more antennae may be provided herein.

The processor (520, 530) generally controls the overall operations of the mobile terminal or the base station. Most particularly, the processor may perform the control functions for performing the above-described embodiments of the present invention, a MAC (Medium Access Control) frame variable control function respective to the service characteristics and frequency environment, a Hand Over function, authentication and encryption functions, and so on. Also, the processor (520, 530) may be provided with an encryption module configured to control the encryption of various messages, and a timer module configured to control the transmission and reception of diverse messages.

The processor (520) of the base station generates configuration information on power-saving including information on a time point, at which the base station does not transmit any packet to the user equipment. When the user equipment information indicating that the base station is not scheduled to transmit any packet to the user equipment at the specific time point, the user equipment may stop (or stall) the operation of the modem at the corresponding time point. Therefore, if the base station notifies the user equipment of the time point, at which the base station is not scheduled to transmit any packet to the user equipment, the user equipment may save power by stalling the operation of its modem using the corresponding time period.

The configuration information on power saving may be configured in a format of defining an HARQ ID, which is not required to be received by the user equipment, a format of defining a reception pattern of the user equipment in subframe units, a Dynamic power-off format, a format of determining a short time interval for shifting to a DRX mode, a format of indicating the user equipment of a transmission unit, during which the base station is not scheduled to transmit any packet to the user equipment, among the multiple transmission units assigned to the user equipment.

The processor (530) of the user equipment operates in a power-down mode in accordance with the configuration information on power-saving, which is received from the base station. More specifically, during a time period starting from a time point, at which the base station is not scheduled to transmit any packet to the user equipment, which is included in the configuration information on power-saving, the processor (530) of the user equipment is assigned with an authority to operate the user equipment in a power-down mode. Accordingly, in order to reduce power consumption, during a time period starting from a time point, at which the base station is not scheduled to transmit any packet to the user equipment, the user equipment may be operated in the power-down mode.

The transmission module (540, 550) is scheduled by the processor, so as to perform predetermined coding and modulation processes on a signal and/or data that are to be transmitted to the outside. Thereafter, the transmission module (540, 550) may transmit the processed signal and/or data to the antenna (500, 510).

The transmission module (540) of the base station transmits the configuration information on power saving to the user equipment and, then, transmit a packet in accordance with the configuration information on power saving. More specifically, during a time period starting from a time point, at which the base station is not scheduled to transmit any packet to the user equipment, which is included in the configuration information on power saving, the base station does not transmit any packet to the user equipment. And, during other time periods, the base station transmits packets to the user equipment.

When the user equipment initiates the power-saving operation, the transmission module (550) of the user equipment transmit a power-saving request message to the base station.

The reception module (560, 570) performs decoding and demodulation on a radio signal, which is received from an external source through the antenna (500, 510), so as to recover the data to the original format (or initial format). Thereafter, the reception module (560, 570) may transmit the recovered data to the processor (520, 530)

When the user equipment initiates the power-saving operation, the reception module (560) of the base station receives a power-saving request message from the user equipment.

The reception module (570) of the user equipment receives configuration information on power saving from the base station.

The memory (580, 590) may store a program configured to process and control the processor, and the memory (580, 590) may also temporarily store inputted/outputted data (in case of a mobile station, a station identifier (STID), a flow identifier (FID), an Action Time, a region allocation information, a frame offset information, and so on).

Furthermore, the memory may include a storage medium of at least one of a flash memory type, a hard disk type, a multimedia card micro type, a card type memory (e.g., SD or XD memory, etc.), Random Access Memory (RAM), Read-Only Memory (ROM), EEPROM (Electrically Erasable Programmable Read-Only Memory), PROM (Programmable Read-Only Memory), magnetic memory, magnetic disk, and optical disk.

The present invention may be realized in another concrete configuration (or formation) without deviating from the scope and spirit of the essential characteristics of the present invention. Therefore, in all aspect, the detailed description of present invention is intended to be understood and interpreted as an exemplary embodiment of the present invention without limitation. The scope of the present invention shall be decided based upon a reasonable interpretation of the appended claims of the present invention and shall come within the scope of the appended claims and their equivalents. Therefore, it is intended that the present invention covers the modifications and variations of this invention provided they come within the scope of the appended claims and their equivalents, and it is not intended to limit the present invention only to the examples presented herein.

It is apparent that claims that do not have any explicit citations within the scope of the claims of the present invention may either be combined to configure another embodiment of the present invention, or new claims may be added during the amendment of the present invention after the filing for the patent application of the present invention.

What is claimed is:

1. A method for saving power, performed by a user equipment in a wireless communication system, the method comprising:
   receiving configuration information regarding power-saving from a base station; and
   operating in a power-down mode in which the user equipment does not perform reception processes, in accordance with the received configuration information for power-saving,
   wherein the configuration information includes at least one of information regarding a point in time at which the base station is not scheduled to transmit packets to the user equipment, and information regarding a point in time at which the base station is scheduled to transmit a packet to the user equipment,
   wherein the configuration information includes a HARQ (Hybrid Automatic Retransmit reQuest) Identifier (ID) monitoring set indicating one or more subframes which the user equipment is required to operate in a power-up mode in which the user equipment performs reception processes,
   wherein the HARQ ID monitoring set is determined based on load, traffic size and channel status of the user equipment, and
   wherein the method further includes operating in the power-up mode in the subframes indicated by the HARQ ID monitoring set only.

2. The method of claim 1, wherein the configuration information corresponds to information regarding a subframe that is to be received by the user equipment with respect to a predetermined cycle period.

3. The method of claim 1, further comprising:
   while the user equipment is being operated in the power-down mode,
   measuring downlink channel by detecting a signal specified for channel measurement; and
   reporting a result of the measurement to the base station.

4. A method for saving power, performed by a base station in a wireless communication system, the method comprising:
   transmitting configuration information regarding power-saving to a user equipment, wherein the configuration information includes at least one of information regarding a point in time at which the base station is not scheduled to transmit packets to the user equipment, and information regarding a point in time at which the base station is scheduled to transmit a packet to the user equipment,
   wherein the configuration information includes a HARQ (Hybrid Automatic Retransmit reQuest) Identifier (ID) monitoring set indicating one or more subframes which the user equipment is required to operate in a power-up mode in which the user equipment performs reception processes, and
   wherein the HARQ ID monitoring set is determined based on load, traffic size and channel status of the user equipment; and
   transmitting packets to the user equipment, which is operating in the power-up mode in the subframes indicated by the HARQ ID monitoring set only.

5. The method of claim 4, further comprising:
   receiving a power-saving request message from the user equipment.

6. The method of claim 4, wherein the configuration information corresponds to information regarding a subframe that is to be received by the user equipment with respect to a predetermined cycle period.

7. A user equipment, comprising:
   a reception module configured to receive configuration information regarding power-saving from a base station; and
   a processor configured to operate a power-down mode in which the user equipment does not perform reception processes, in accordance with the received configuration information on power-saving,
   wherein the configuration information includes at least one of information regarding a point in time at which the base station is not scheduled to transmit packets to the user equipment, and information regarding a point in time at which the base station is scheduled to transmit a packet to the user equipment,
   wherein the configuration information includes a HARQ (Hybrid Automatic Retransmit reQuest) Identifier (ID) monitoring set indicating one or more subframes which the user equipment is required to operate in a power-up mode in which the user equipment performs reception processes,
   wherein the HARQ ID monitoring set is determined based on load, traffic size and channel status of the user equipment, and
   wherein the processor is further configured to operate in the power-up mode in the subframes indicated by the HARQ ID monitoring set only.

8. The user equipment of claim 7, wherein the configuration information corresponds to information regarding a subframe that is to be received by the user equipment with respect to a predetermined cycle period.

9. The user equipment of claim 7, wherein the processor is further configured to:
   while the user equipment is being operated in the power-down mode, measure downlink channel by detecting a signal specified for channel measurement; and
report a result of the measurement to the base station.

10. A base station, comprising:
a processor configured to generate configuration information regarding power-saving, wherein the configuration information on power-saving includes at least one of information regarding a point in time at which the base station is not scheduled to transmit packet to a user equipment, and information regarding a point in time at which the base station is scheduled to transmit a packet to a user equipment,
wherein the configuration information includes a HARQ (Hybrid Automatic Retransmit reQuest) Identifier (ID) monitoring set indicating one or more subframes which the user equipment is required to operate in a power-up mode in which the user equipment performs reception processes, and
wherein the HARQ ID monitoring set is determined by the base station based on load, traffic size and channel status of the user equipment; and
a transmission module configured to transmit the configured configuration information to the user equipment and to transmit packets to the user equipment, which is operating in the power-up mode, in the subframes indicated by the HARQ ID monitoring set only.

11. The base station of claim 10, further comprising:
a reception module configured to receive a power-saving request message from the user equipment.

12. The base station of claim 10, wherein the configuration information corresponds to information regarding a subframe that is to be received by the user equipment with respect to a predetermined cycle period.

13. The method of claim 1, further comprising:
transmitting, to the base station, information indicating whether or not the power-saving method is supported by the user equipment.

14. The method of claim 4, further comprising:
transmitting, to the user equipment, information indicating whether or not the power-saving method is supported by the base station.

15. The user equipment of claim 7, wherein the processor is configured to transmit, to the base station, information indicating whether or not the power-saving configuration is supported by the user equipment.

16. The base station of claim 10 wherein the processor is configured to transmit, to the base station, information indicating whether or not the power-saving configuration is supported by the base station.

17. The method of claim 4, further comprising:
receiving downlink channel information measured by the user equipment while the user equipment is being operated in a power-down mode.

18. The base station of claim 10, wherein the processor is further configured to receive downlink channel information measured by the user equipment while the user equipment is being operated in a power-down mode.

* * * * *